(12) United States Patent
Barsness et al.

(10) Patent No.: US 10,565,209 B2
(45) Date of Patent: Feb. 18, 2020

(54) INJECTING OUTLIER VALUES

(71) Applicant: International Business Machines Corporation, Armonk, NY (US)

(72) Inventors: Eric L. Barsness, Pine Island, MN (US); Michael J. Branson, Rochester, MN (US); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 14/955,637

(22) Filed: Dec. 1, 2015

(65) Prior Publication Data

US 2017/0154081 A1 Jun. 1, 2017

(51) Int. Cl.
*G06F 16/2455* (2019.01)
*G06F 16/28* (2019.01)

(52) U.S. Cl.
CPC ...... *G06F 16/24568* (2019.01); *G06F 16/285* (2019.01)

(58) Field of Classification Search
CPC .............. G06F 17/30516; G06F 17/30598
USPC .................................. 707/698, 740
See application file for complete search history.

(56) References Cited

U.S. PATENT DOCUMENTS

| 7,962,638 | B2 * | 6/2011 | Cherkauer | G06F 3/0608 |
| | | | | 708/303 |
| 8,458,650 | B2 | 6/2013 | Andrade et al. | |
| 8,700,763 | B2 | 4/2014 | Mackey | |
| 9,747,344 | B2 * | 8/2017 | Barsness | G06F 16/24568 |
| 2002/0123979 | A1 * | 9/2002 | Chaudhuri | G06F 17/30489 |
| 2005/0050087 | A1 * | 3/2005 | Milenova | G06F 16/285 |
| 2012/0054184 | A1 * | 3/2012 | Masud | G06F 17/30598 |
| | | | | 707/737 |
| 2012/0072390 | A1 * | 3/2012 | Wang | G06N 5/02 |
| | | | | 706/54 |
| 2012/0166447 | A1 * | 6/2012 | Nice | G06F 17/30979 |
| | | | | 707/746 |
| 2012/0311172 | A1 * | 12/2012 | Branson | H04L 65/60 |
| | | | | 709/231 |
| 2013/0179586 | A1 * | 7/2013 | Branson | G06F 5/06 |
| | | | | 709/231 |
| 2013/0179591 | A1 * | 7/2013 | Branson | H04L 65/608 |
| | | | | 709/231 |

(Continued)

OTHER PUBLICATIONS

Morrow, et al., "Topology Perturbation for Detecting Malicious Data Injection", 2012 45th Hawaii International Conference of System Sciences. IEEE Computer Society. DOI 10.1109/HICSS.2012.594. pp. 2104-2113. © 2012 IEEE.

(Continued)

*Primary Examiner* — James Trujillo
*Assistant Examiner* — Jessica N Le
(74) *Attorney, Agent, or Firm* — Daniel C. Housley (57) ABSTRACT

A plurality of tuple values of a stream of tuples is gathered. A normal operating range of the stream of tuples is determined. The normal operating range includes essentially all expected values of the stream of tuples. An outlier value which is outside of the normal operating range is identified. The outlier value is injected into the stream of tuples as an outlier tuple. A reaction to the injection of the outlier tuple is detected and recorded.

19 Claims, 4 Drawing Sheets

(56) References Cited

U.S. PATENT DOCUMENTS

| | | | | |
|---|---|---|---|---|
| 2014/0278210 A1* | 9/2014 | Krauss | ................... | G01B 21/04 |
| | | | | 702/150 |
| 2014/0278337 A1* | 9/2014 | Branson | .............. | G06F 11/3457 |
| | | | | 703/22 |
| 2014/0297680 A1* | 10/2014 | Triou, Jr. | .......... | G06F 17/30516 |
| | | | | 707/769 |
| 2014/0359271 A1* | 12/2014 | Gedik | ................. | H04L 12/6418 |
| | | | | 713/100 |
| 2015/0128135 A1* | 5/2015 | Cao | ....................... | G06F 9/5066 |
| | | | | 718/1 |
| 2016/0306857 A1* | 10/2016 | Barsness | ........... | G06F 16/24568 |
| 2017/0094537 A1* | 3/2017 | Yang | .................... | H04W 24/04 |

OTHER PUBLICATIONS

Tan, et al., "One Pass Outlier Detection for Streaming Categorical Data", ResearchGate, Conference Paper, Sep. 2013. Retrieved on Sep. 9, 2015. 9 pages. DOI: 10.1007/978-94-007-7293-9_4.

Unknown, Fuzz testing, From Wikipedia, the free encyclopedia. Last printed on Sep. 9, 2015, 5:15 PM. 5 pages. https://en.wikipedia.org/wiki/Fuzz_testing.

* cited by examiner

INJECTING OUTLIER VALUES

BACKGROUND

The present disclosure relates to stream computing environments. Stream computing may be utilized to provide real-time analytic processing to large quantities of data. Stream computing may be used for scientific research purposes, such as weather forecasting and complex physics modelling. Stream computing may be used for commercial purposes, such as real-time inventory management and stock market tracking. Stream computing may be used for medical purposes, such as analyzing complex and interconnected functions of the human body. Stream computing may be used by end users to more immediately and accurately understand and contextualize large amounts of information.

SUMMARY

Aspects of the disclosure include a system, a method, and a computer program product for injecting outlier values into a computing stream. A plurality of tuple values of the stream of tuples may be gathered. A normal operating range of the stream of tuples may be determined. The normal operating range may include essentially all expected values of the stream of tuples. An outlier value which may be outside of the normal operating range is identified. The outlier value may be injected into the stream of tuples as an outlier tuple. A reaction to the injection of the outlier tuple is detected.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing, and more specifically, to injecting outlier values into a stream computing application. The stream computing application processes a stream of tuples. Values of the stream of tuples may be gathered and analyzed. A standard range of gathered values may be determined, such that essentially all gathered values of the stream computing application fall within the standard range. Values which are outside of this range may be determined, and thereupon inserted into the stream computing application. While the present disclosure is not necessarily limited to such applications, various aspects of the disclosure may be appreciated through a discussion of various examples using this context.

Some conventional stream systems process all data which is received from a source in the form of tuples. Conventional stream applications may be written and/or configured to process a range of source values. In some instances, the source may provide outlier tuples which include values outside of the range of source values. Processing these outlier tuples may have unexpected consequences in conventional stream applications. Where a conventional stream application is not written and/or configured to address outlier tuples, the conventional stream application may fail to fully mitigate or leverage desirable or undesirable outlier tuples, respectively. In certain instances, where outlier tuples would have positive effects downstream, a conventional outlier detection/removal application which removes outlier values may be undesirable.

Aspects of the present disclosure relate to injecting outlier values into a stream computing application. The values of tuples in a stream of tuples of the stream computing application may be gathered. The values may be statistically evaluated to determine a typical range of values. Outlier values which do not fall within the typical range of values may be identified. These outlier values may be inserted via created tuples into a stream of tuples. An outlier controller may observe and/or analyze how the system reacts to the outlier values. By identifying and inserting outlier values into the stream computing application, the stream computing application may become more robust through increased performance in relation to addressing outlier values.

One use of computing systems (interchangeably used herein with computer systems) is to collect available information, manipulate the collected information, and make decisions based on the manipulated information. Existing computer systems may operate on information through means of databases that allow users to determine what has happened and to make predictions for future results based on past events. These computer systems receive information from a variety of sources and then record the information into permanent databases. After the information has been recorded in the databases, the computing systems run algorithms on the information—sometimes generating new information and then performing associated transformations on and storing of the new information—to make determinations and provide context to users.

The ability of these existing computer systems to analyze information and provide meaning to users may be insufficient in some situations. The ability of large organizations, such as corporations and governments, to make decisions based on information analysis may be impaired by the limited scope of the information available. In addition, the analysis may be of limited value because it relies on stored structural databases that may contain out-of-date information. This may lead to decisions that are of limited value or, in some cases, inaccurate in light of unconsidered or incompletely-considered data. For example, a weather forecast service may be unable to accurately predict precipitation for a given region, or a stock brokerage firm may make an incorrect decision regarding a trend in trading of shares.

The analytical shortcomings of existing computer systems may be compounded by other factors. First, the world is becoming more instrumented, as previously unintelligent devices are now becoming intelligent devices. Intelligent devices may include devices that have been historically unable to provide analytical information but with the additions of sensors can now do so (e.g., automobiles that are now able to provide diagnostic information to their owners or manufacturers, thermostats that now communicate information about daily temperature fluctuations in homes to users via webpages, etc.). Second, these shortcomings may also be compounded by an increase in communication from information sources, as previously isolated devices are now becoming interconnected (e.g., appliances within homes communicate with each other and with power utilities to more efficiently utilize electricity). These new sources of information may provide volumes of not only isolated data points but also relationships between the newly intelligent devices.

A third compounding factor is that users of computing systems may desire continuous analysis of streams of information (e.g., a graphical chart showing up-to-the-minute statistical distribution of ongoing data of the stream of tuples), while current methods of data acquisition may provide only an event-based approach of analyzing pre-recorded information. For example, an existing analytics package may receive a finite amount of data and, later, apply analysis to the data. This approach may not work when dealing with a continuous stream of data. A fourth compounding factor is that existing computer systems may have deficiencies in handling not only the volume of information but also in dealing with the unstructured nature of the information (e.g., sensors, cameras, and other new data sources which provide no context or format, just raw information). The existing analytics methods of conventional computing systems may need to modify and rearrange this data in order to provide any kind of context for the raw information. The modifications and rearrangements may take time or resources that many existing computing systems may not be able to provide.

Yet another potential drawback is that existing computing systems may not provide scalable solutions to new users. The advent of smart and connected devices has provided new use-cases for analytics of continuous streams of information. Modern systems of large-scale data collection, however, may require significant user training and provide unintuitive interfaces. For example, a farmer may have animals on a farm instrumented with sensors to monitor the health and location of the animals. The data from these sensors may enable the farmer to respond to changing health conditions of the animals, but only if the sensor data is collected and transformed into a usable format to provide meaningful information to the farmer in real-time. The farmer may not have the money to provide training and resources to a technical expert to construct a large-scale analytics package, and the obtained information may be left unused.

Stream-based computing (e.g., computing within a stream application) may provide users with a way to obtain meaning from extremely large sets of information (such extremely larges sets of information hereinafter referred to as big data). Stream computing may provide users with the ability to analyze initial information as it is captured but before it reaches a final destination (e.g., initial data from sensors being transmitted to a flat file, initial records being collected from internet queries and being stored to a database). In some embodiments, stream computing may provide users with the ability to analyze a stream of information that is too large to be captured and placed into a final destination (e.g., sensor values from thousands of sensors that will be discarded after being measured could be utilized by a stream computing application to provide detailed analysis). Stream computing may provide the bandwidth to process big data continuously and in real-time (e.g., generating context from tens of millions of records per second with low latency, moving from record reception to meaningful action within microseconds). Stream computing may provide users with the ability to utilize familiar programmatic conventions to provide context to big data (e.g., using a structured language to retrieve, format, and conditionally select a subset of information regarding millions of records as those records are generated, using conditional language to trigger an action every few milliseconds based on traditional program statements applied every hundred microseconds).

Information flowing through a stream application may be in the form of streams. A stream may be made up of tuples. A tuple may be a sequence of one or more associated attributes in a relational format. The tuples may share characteristics of a classical relational database (e.g., a single tuple may be similar to a row in a relational database and the attributes of a tuple may be similar to the columns of the row). The tuples may have non-relational database relationships to other tuples of a stream application (e.g., individual values, key-value pairs, flat files, etc.). Tuples may include values in a variety of known computer formats (e.g., integer, float, Boolean, string, etc.). Tuples may contain attributes about themselves, such as metadata. As used herein, a stream, streams, or data stream may refer to a sequence of tuples flowing through a stream application. Generally, a stream may be considered a pseudo-infinite sequence of tuples.

Figure 1:
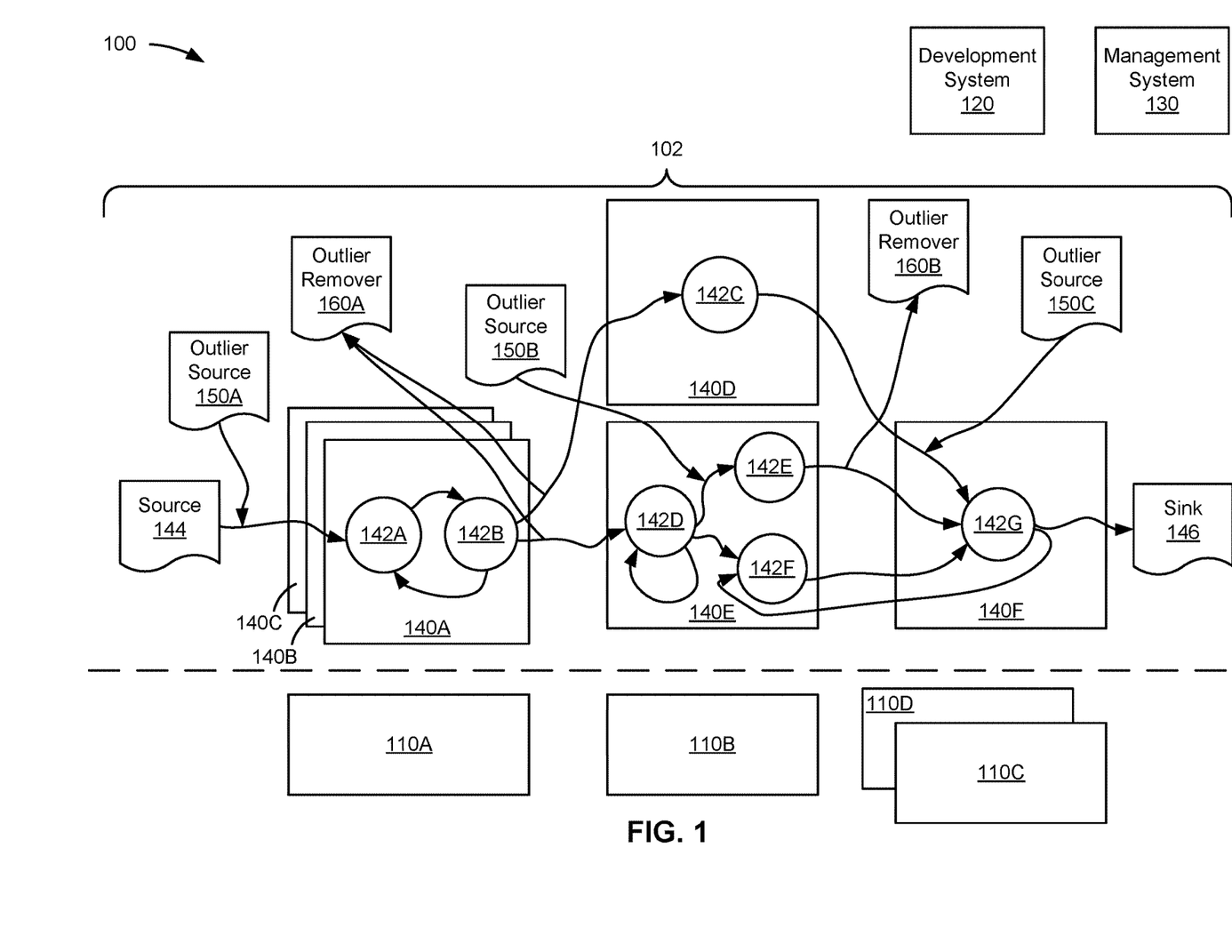
FIG. 1 depicts a stream application, according to some embodiments.

FIG. 1 depicts a stream computing application (stream application) 100 consistent with embodiments of the present disclosure. The stream application 100 may be represented in the form of an operator graph 102. The operator graph 102 may visually represent to a user the flow of data through the stream application 100. The operator graph 102 may define how tuples are routed through the various components of the stream application 100 (e.g., an execution path). The stream application 100 is executed or implemented by one or more compute nodes 110A, 110B, 110C, and 110D (collectively, 110) which host an operator graph 102 which is developed by a development system 120 and managed by a management system 130. The operator graph 102 may include one or more processing elements 140A, 140B, 140C, 140D, 140E, 140F (collectively, 140) and one or more stream operators 142A, 142B, 142C, 142D, 142E, 142F, 142G (collectively, 142). The processing elements 140 and/or stream operators 142 may receive information from one or more sources 144 and may output information to one or more sinks 146. The processing elements 140 and/or stream operators 142 may also receive outlier information from one or more outlier sources 150A, 150B, 150C (collectively, 150) and have outlier information removed by one or more outlier removers 160A, 160B (collectively, 160).

It should be appreciated that the stream application 100 depicted in FIG. 1 is for example purposes. Stream applications may vary in the number of compute nodes, processing elements, stream operators, outlier sources, and/or outlier removers. The stream application may also vary the roles and/or responsibilities performed by any of the components or may include other components not depicted. In embodiments, the stream application 100 may vary the number or role of components dynamically in response to changing situations (e.g., outlier sources may be added/removed and/or reconfigured without human input in response to different system/application conditions). For example, some or all of the functionality of the development system 120 may be performed by the management system 130. In another example, the functionalities of the development system 120 and the management system 130 may be performed by a singular administrative system (not depicted). The administrative system may be configured to perform these tasks without deviation from the embodiments disclosed herein. In yet another example, the functionalities of the development system 120 and the management system 130 may be performed by a plurality of services (e.g., ten or more individual software programs each configured to perform a specific function).

Figure 2:
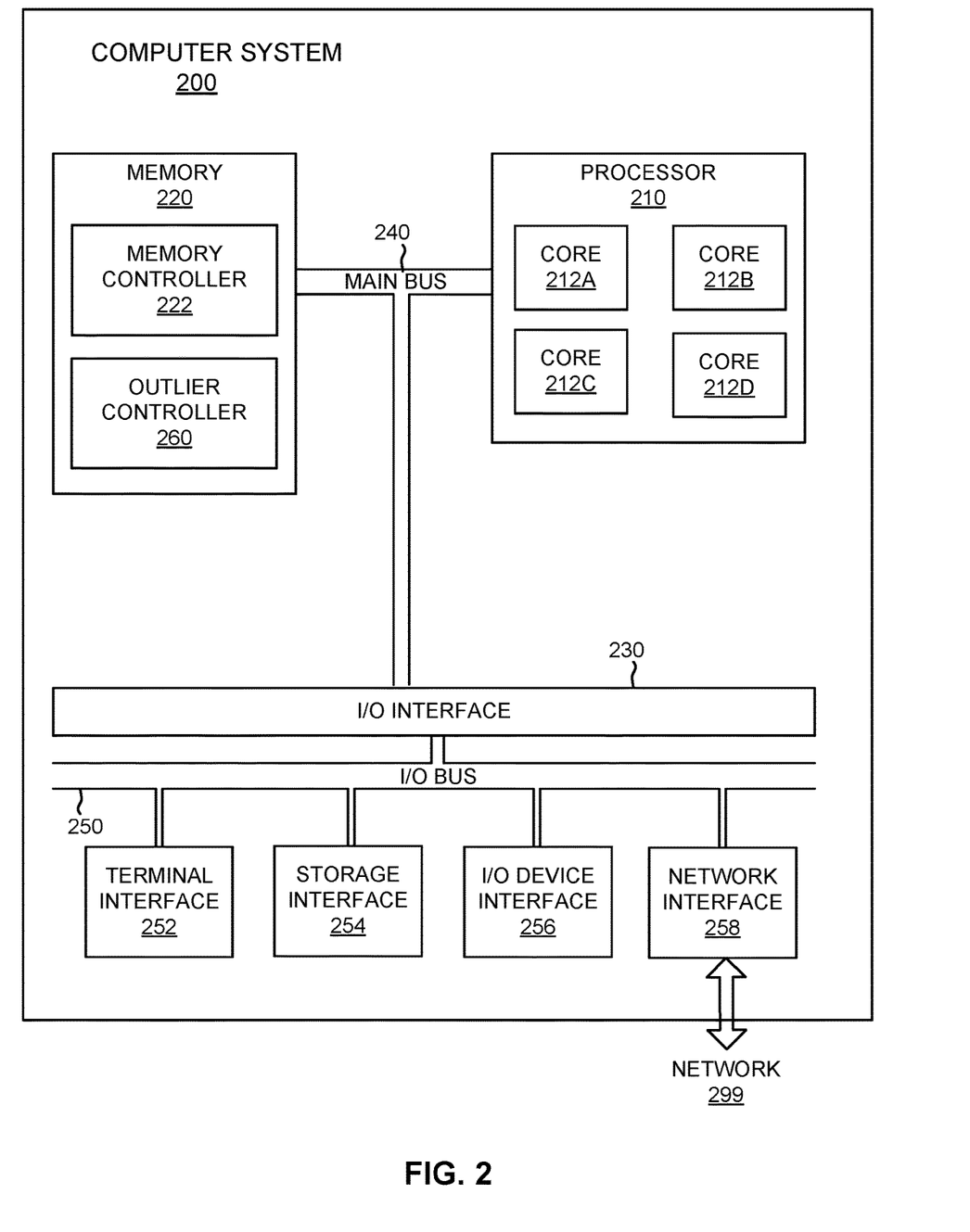
FIG. 2 depicts representative major components of an example computer system, according to some embodiments.

The compute nodes 110 may be computer systems and may each include the following components: a processor, a memory, and an input/output interface (herein I/O). Each compute node 110 may also include an operating system or a hypervisor. In some embodiments, the compute nodes 110 may perform operations for the development system 120, the management system 130, the processing elements 140, the stream operators 142, the outlier source 150 and/or the outlier removers 160. The compute nodes 110 may be categorized as management hosts, application hosts, or mixed-use hosts. A management host may perform operations for the development system 120 and/or the management system 130. An application host may perform operations for the processing elements 140 and stream operators 142. A mixed-use host may perform operations of both a management host and an application host. FIG. 2 depicts a computer system that may be a compute node consistent with embodiments of the present disclosure.

A network (e.g., a local area network, the Internet, etc.) may commutatively couple each of the nodes 110 together. The network may be similar to the network 299 of FIG. 2. For example, node 110A may communicate with nodes 110B, 110C, and 110D through the network. The computes nodes 110 may communicate with the network by way of the I/O. The network may include a variety of physical communication channels or links. The links may be wired, wireless, optical, or any other suitable media. The network may include a variety of network hardware and software for performing routing, switching, and other functions, such as routers, switches, or bridges. The nodes 110 may communicate through a variety of protocols (e.g., the internet protocol, the transmission control protocol, the file transfer protocol, the hypertext transfer protocol, etc.). In some embodiments, the nodes 110 may share the network with other hardware, software, or services (not depicted).

The development system 120 may provide a user with the ability to create a stream application that is targeted to process specific sets of data. The development system 120 may operate on a computer system (not depicted in FIG. 1), such as the computer system depicted in FIG. 2. The development system 120 may operate on one or more of the compute nodes 110. The development system 120 may generate one or more configuration files that describes the stream computing application 100 (e.g., the processing elements 140, the stream operators 142, the sources 144, the sinks 146, the outlier sources 150, the outlier removers 160, the assignment of the aforementioned to the compute nodes 110, etc.). The development system 120 may receive requests from a user to generate the stream application 100. The development system 120 may receive requests from a user to generate other stream applications (not depicted). The development system 120 may communicate with the management system 130 to pass along the configuration on any stream applications it creates.

The development system 120 may generate the configuration by considering the performance characteristics of the software components (e.g., the processing elements 140, the stream operators 142, etc.) the hardware (e.g., the compute nodes 110, the network) and the data (e.g. the sources 144, the format of the tuples, etc.). In a first example, the development system 120 may determine that the overhead of running processing elements 140A, 140B, and 140C together on compute node 110A results in better performance than running them on separate compute nodes. The performance may be better because of a latency incurred by running processing elements 140A, 140B, and 140C across the network between compute nodes 110A and 110B. In a second example, the development system 120 may determine that the memory footprint of placing stream operators 142C, 142D, 142E, and 142F into a single processing element 140E is larger than the cache of a first processor in compute node 110B. To preserve memory space inside the cache of the first processor the development system 120 may decide to place only the stream operators 142D, 142E, and 142F into a single processing element 140E despite the inter-process communication latency of having two processing elements 140D and 140E.

In a third example of considering the performance characteristics, the development system 120 may identify a first operation (e.g., an operation being performed on processing element 140F on compute node 110C) that requires a larger amount of resources within the stream application 100. The development system 120 may assign a larger amount of resources (e.g., operating the processing element 140F on compute node 110D in addition to compute node 110C) to aid the performance of the first operation. The development system 120 may identify a second operation (e.g., an operation being performed on processing element 140A) that requires a smaller amount of resources within the stream application 100. The development system 120 may further determine that the stream application 100 may operate more efficiently through an increase in parallelization (e.g., more instances of processing element 140A). The development system 120 may create multiple instances of processing element 140A (e.g., processing elements 140B and 140C). The development system 120 may then assign processing elements 140A, 140B, and 140C to a single resource (e.g., compute node 110A). Lastly, the development system 120 may identify a third operation and fourth operation (e.g., operations being performed on processing elements 140D and 140E) that each require low levels of resources. The development system 120 may assign a smaller amount of resources to the two different operations (e.g., having them share the resources of compute node 110B rather than each operation being performed on its own compute node).

The development system 120 may include a compiler (not depicted) that compiles modules (e.g., processing elements 140, stream operators 142, etc.). The modules may be source code or other programmatic statements. The modules may be in the form of requests from a stream processing language (e.g., a computing language containing declarative statements allowing a user to state a specific subset from information formatted in a specific manner). The compiler may translate the modules into an object code (e.g., a machine code targeted to the specific instruction set architecture of the compute nodes 110). The compiler may translate the modules into an intermediary form (e.g., a virtual machine code). The compiler may be a just-in-time compiler that executes as part of an interpreter. In some embodiments, the compiler may be an optimizing compiler. In some embodiments, the compiler may perform optimizations known to one skilled in the art, such as peephole optimizations, local optimizations, loop optimizations, inter-procedural or whole-program optimizations, machine code optimizations, or any other optimizations that reduce either/both the amount of time required to execute the object code or the amount of memory required to execute the object code.

The management system 130 may monitor and administer the stream application 100. The management system 130 may operate on a computer system (not depicted), such as the computer system depicted in FIG. 2. The management system 130 may operate on one or more of the compute nodes 110. The management system 130 may also provide the operator graph 102 of the stream application 100. The management system 130 may host the services that make up the stream application 100 (e.g., services that execute method 300 of FIG. 3 using outlier sources 150 and removers 160, services that monitor the health of the compute nodes 110, the performance of the processing elements 140 and stream operators 142, etc.). The management system 130 may receive requests from users (e.g., requests to authenticate and authorize users of the stream application 110, requests to view the information generated by the stream application, requests to view the operator graph 102, etc.).

The management system 130 may provide a user with the ability to create multiple instances of the stream application 100 configured by the development system 120. For example, if a second instance of the stream application 100 is required to perform the same processing, then the management system 130 may allocate a second set of compute nodes (not depicted) for performance of the second instance of the stream application. The management system 130 may also reassign the compute nodes 110 to relieve bottlenecks in the system. For example, as shown, processing elements 140D and 140E are executed by compute node 110B. Processing element 140F is executed by compute nodes 110C and 110D. In one situation, the stream application 100 may experience performance issues because processing elements 140D and 140E are not providing tuples to processing element 140F before processing element 140F enters an idle state. The management system 130 may detect these performance issues and may reassign resources from compute node 110D to execute a portion or all of processing element 140D, thereby reducing the workload on compute node 110B. The management system 130 may also perform operations of the operating systems of the compute nodes 110, such as the load balancing and resource allocation of the processing elements 140 and stream operators 142. By performing operations of the operating systems, the management system 130 may enable the stream application 100 to more efficiently use the available hardware resources and increase performance (e.g., by lowering the overhead of the operating systems and multiprocessing hardware of the compute nodes 110).

The processing elements 140 may perform the operations of the stream application 100. Each of the processing elements 140 may operate on one or more of the compute nodes 110. In some embodiments, a given processing element 140 may operate on a subset of a given compute node 110, such as a processor or a single core of a processor of a compute node 110. In some embodiments, a given processing element 140 may operate on multiple compute nodes 110. The processing elements 140 may be generated by the development system 120. Each of the processing elements 140 may be in the form of a binary file and additionally library files (e.g., an executable file and associated libraries, a package file containing executable code and associate resources, etc.).

Each of processing elements 140 may include configuration information from the development system 120 or the management system 130 (e.g., the resources and conventions required by the relevant compute node 110 to which it has been assigned, the identity and credentials necessary to communicate with the sources 144 or sinks 146, the identity and credentials necessary to communicate with other processing elements, etc.). Each of the processing elements 140 may be configured by the development system 120 to run optimally upon one of the compute nodes 110. For example, processing elements 140A, 140B, and 140C may be compiled to run with optimizations recognized by an operating system running on compute node 110A. The processing elements 140A, 140B, and 140C may also be optimized for the particular hardware of compute node 110A (e.g., instruction set architecture, configured resources such as memory and processor, etc.).

Each of the processing elements 140 may include one or more stream operators 142 that perform basic functions of the stream application 100. As streams of tuples flow through the processing elements 140, as directed by the operator graph 102, they pass from one stream operator to another (e.g., a first processing element may process tuples and place the processed tuples in a queue assigned to a second processing element, a first stream operator may process tuples and write the processed tuples to an area of memory designated to a second stream operator, tuples after processing may not be moved but may be updated with metadata to signify they are ready for processing by a new processing element or stream operator, etc.).

Multiple stream operators 142 within the same processing element 140 may benefit from architectural efficiencies (e.g., reduced cache missed, shared variables and logic, reduced memory swapping, etc.). The processing elements 140 and the stream operators 142 may utilize inter-process communication (e.g., network sockets, shared memory, message queues, message passing, semaphores, etc.). The processing elements 140 and the stream operators 142 may utilize different inter-process communication techniques depending on the configuration of the stream application 100. For example: stream operator 142A may use a semaphore to communicate with stream operator 142B; processing element 140A may use a message queue to communicate with processing element 140C; and processing element 140B may use a network socket to communicate with processing element 140D.

The stream operators 142 may perform the basic logic and operations of the stream application 100 (e.g., processing tuples and passing processed tuples to other components of the stream application). By separating the logic that would conventionally occur within a single larger program into basic operations performed by the stream operators 142, the stream application 100 may provide greater scalability. For example, tens of compute nodes hosting hundreds of stream operators in a stream application may enable processing of millions of tuples per second. The logic may be created by the development system 120 before runtime of the stream application 100. In some embodiments, the sources 144 and the sinks 146 may also be stream operators 142. In some embodiments, the sources 144 and the sinks 146 may link multiple stream applications together (e.g., the sources 144 could be sinks for a second stream application and the sinks 146 could be sources for a third stream application). The stream operators 142 may be configured by the development system 120 to optimally perform the stream application 100 using the available compute nodes 110. The stream operators may 142 send and receive tuples from other stream operators. The stream operators 142 may receive tuples from the sources 144 and may send tuples to the sink 146.

The stream operators 142 may perform operations (e.g., conditional logic, iterative looping structures, type conversions, string formatting, etc.) upon the attributes of a tuple. In some embodiments, each stream operator 142 may perform only a very simple operation and may pass the updated tuple on to another stream operator in the stream application 100—simple stream operators may be more scalable and easier to parallelize. For example, stream operator 142B may receive a date value to a specific precision and may round the date value to a lower precision and pass the altered date value to stream operator 142D that may change the altered date value from a 24-hour format to a 12-hour format. In this way, different portions of the stream of tuples may have different data ranges (e.g., different statistical distributions of values of the tuples) depending upon the basic functions performed by the stream operators 142. A given stream operator 142 may not change anything about a tuple. The stream operators 142 may perform operations upon a tuple by adding new attributes or removing existing attributes.

The stream operators 142 may perform operations upon a stream of tuples by routing some tuples to a first stream operator and other tuples to a second stream operator (e.g., stream operator 142B sends some tuples to stream operator 142C and other tuples to stream operator 142D). The stream operators 142 may perform operations upon a stream of tuples by filtering some tuples (e.g., culling some tuples and passing on a subset of the stream to another stream operator). The stream operators 142 may also perform operations upon a stream of tuples by routing some of the stream to itself (e.g., stream operator 142D may perform a simple arithmetic operation and as part of its operation it may perform a logical loop and direct a subset of tuples to itself). In some embodiments, a particular tuple output by a stream operator 142 or processing element 140 may not be considered to be the same tuple as a corresponding input tuple even if the input tuple is not changed by the stream operator or the processing element.

The management system 130 may gather values from the stream of tuples. The amount of tuples which are gathered may be sufficient to determine an indicative range of values which the stream application 100 processes. The values may be gathered at different points during the stream application, whether straight from a source 144, in the middle of a processing element 140, or near the end of the stream of tuples of the operator graph 102, among other possibilities. For example, the management system 130 may gather values before stream operator 142A, stream operator 142E, and stream operator 142G. The management system 130 may determine a standard range of values of the stream of tuples at different points within the stream of tuples. Using this, the management system 130 may determine outlier values which are outside the standard range of values by at least some predetermined amount at these given points. As used herein, values which are outside the standard range by at least some predetermined amount are referred to as values which are significantly outside the standard range. The management system 130 may create outlier sources 150 to inject these outlier values into the stream of tuples.

Using the example above, where the management system 130 gathers values before a subset of stream operators 142A, 142E, and 142G, the management system 130 may create three outlier sources 150A, 150B, 150C which may inject outlier values before said subset of stream operators 142A, 142E, 142G as depicted. The management system 150 may also include outlier removers 160 which remove the injected outlier tuples. The outlier remover 160 may be located immediately after a single stream operator processed the outlier value, such as outlier remover 160B is positioned to remove outlier values from outlier source 150B after a single stream operator 142E processed said outlier value. Alternatively, an outlier remover 160 may be located such that numerous stream operators 142 and/or processing elements 140 may process the outlier value before the outlier value is removed. For example, outlier remover 160A is positioned to remove outlier values from outlier source 150A after the outlier value has passed through the processing element 140A, allowing two stream operators 142A, 142B to process the outlier value. In other embodiments, an outlier source 150 may have no corresponding outlier remover 160, such as the case with outlier source 150C.

Outlier sources 150 may inject values which are outliers for their respective location within the stream of tuples. For example, the management system 130 may determine a first range of standard values flowing into stream operator 142A, a second range of standard values flowing into stream operator 142E, and a third range of standard values flowing into stream operator 142G. The outlier source 150A may be configured to provide outliers to the first range, while the outlier source 150B may be configured to provide outliers to the second range, and the outlier source 150C is configured to provide outliers to the third range. In this way, each outlier source 150 may provide different outlier values depending upon the normal value distribution of tuple value at the location at which the outlier source 150 is injecting outliers.

While the outlier discussion above discusses outliers being managed by the management system 130, in some embodiments outlier processing may be configured (e.g., determined and set up with outlier sources 150 and removers 160) using the development system 120. In other embodiments, both the development system 120 and the management system 130 may manage aspects of outlier processing.

FIG. 2 depicts representative components of an example computer system 200, in accordance with embodiments of the present disclosure. It is to be appreciated that individual components may vary in complexity, number, type, and\or configuration. The particular examples disclosed are for example purposes only and are not necessarily the only such variations. The computer system 200 may comprise a processor 210, memory 220, an input/output interface (herein I/O or I/O interface) 230, and a main bus 240. The main bus 240 may provide communication pathways for the other components of the computer system 200. In some embodiments, the main bus 240 may connect to other components such as a specialized digital signal processor (not depicted).

Figure 3:
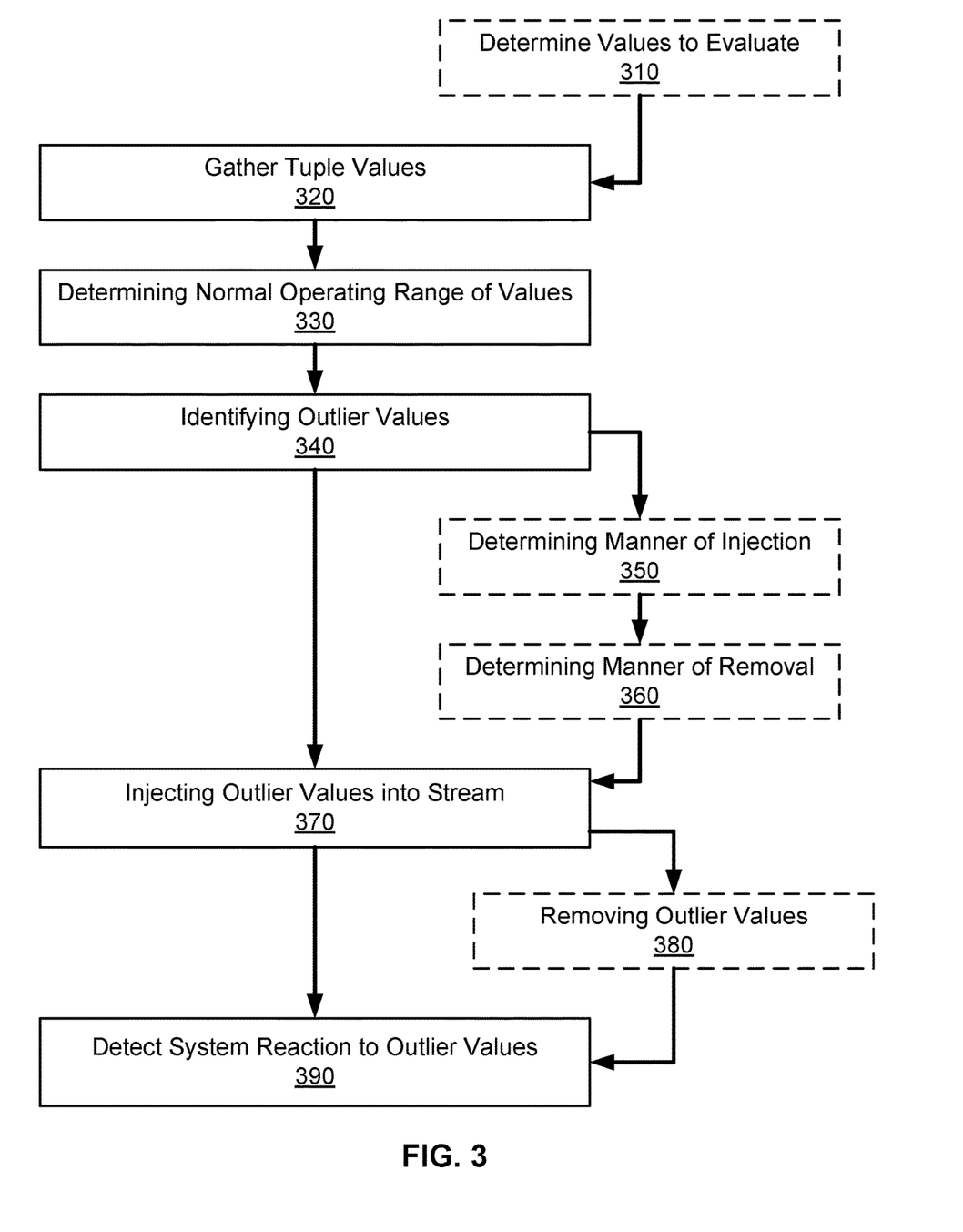
FIG. 3 depicts a method of injecting outlier values into a stream computing application, according to embodiments.

The processor 210 of the computer system 200 may be comprised of one or more cores 212A, 212B, 212C, 212D (collectively 212). The processor 210 may additionally include one or more memory buffers or caches (not depicted) that provide temporary storage of instructions and data for the cores 212. The cores 212 may perform instructions provided from the caches or from the memory 220 (e.g., such as instructions from the outlier controller 260 to perform the acts with respect tom method 300) and output the result to caches or the memory. The cores 212 may be comprised of one or more circuits configured to perform one or methods consistent with embodiments of the present disclosure. In some embodiments, the computer system 200 may contain multiple processors 210. In some embodiments, the computer system 200 may be a single processor 210 with a singular core 212.

The memory 220 of the computer system 200 may include a memory controller 222. In some embodiments, the memory 220 may comprise a random-access semiconductor memory, storage device, or storage medium (either volatile or non-volatile) for storing data and programs. In some embodiments, the memory may be in the form of modules (e.g., dual in-line memory modules). The memory controller 222 may communicate with the processor 210, facilitating storage and retrieval of information in the memory 220. The memory controller 222 may communicate with the I/O interface 230, facilitating storage and retrieval of input or output in the memory 220. The memory 220 may store applications whose instructions may be executed by the processor 210. These applications may include the outlier controller 260. The outlier controller 260 may cause the processor 210 to execute at least one part of the functionality described below with respect to method 300. Specifically, the outlier controller 260 may gather values from the stream of tuples, determine a normal operating range of these values, identify and inject outlier values into the stream of tuples, and then record/respond to the reaction of the system.

The I/O interface 230 may comprise an I/O bus 250, a terminal interface 252, a storage interface 254, an I/O device interface 256, and a network interface 258. The I/O interface 230 may connect the main bus 240 to the I/O bus 250. The I/O interface 230 may direct instructions and data from the processor 210 and memory 220 to the various interfaces of the I/O bus 250. For example, instructions from the outlier controller 260 may be processed by the processor 210 and sent through the network interface 258 to configure stream components on different compute nodes of the stream environment (e.g., compute nodes 110 of FIG. 1). The I/O interface 230 may also direct instructions and data from the various interfaces of the I/O bus 250 to the processor 210 and memory 220. For example, a user may transmit instructions as to the manner of how outliers will be injected using an I/O device (e.g., mouse and keyboard), which may be received by the I/O device interface 256. The various interfaces may include the terminal interface 252, the storage interface 254, the I/O device interface 256, and the network interface 258. In some embodiments, the various interfaces may include a subset of the aforementioned interfaces (e.g., an embedded computer system in an industrial application may not include the terminal interface 252 and the storage interface 254).

Logic modules throughout the computer system 200—including but not limited to the memory 220, the processor 210, and the I/O interface 230—may communicate failures and changes to one or more components to a hypervisor or operating system (not depicted). The hypervisor or the operating system may allocate the various resources available in the computer system 200 and track the location of data in memory 220 and of processes assigned to various cores 212. In embodiments that combine or rearrange elements, aspects and capabilities of the logic modules may be combined or redistributed. These variations would be apparent to one skilled in the art.

FIG. 3 is a flowchart illustrating a method 300 for injecting outlier values into a stream application. The stream application may process data from a stream of tuples. The stream application may be similar to the stream application 100 of FIG. 1. Blocks with hashed lines in FIG. 3 may be optional steps within method 300. Method 300 may be enacted by an outlier controller. The outlier controller may be similar to the outlier controller 260 of FIG. 2. The visual arrangement of blocks in the flowchart of FIG. 3 is not to be construed as limiting the order in which the individual acts/operations may be performed, as certain embodiments may perform the operations of FIG. 3 in alternative orders.

At block 310 a class of values to be evaluated may be determined. The class of values may be determined by the outlier controller or by a human operator. The class of values may be a certain variety of tuple which is processed by the stream application. For example, the stream application may process values dealing with time (e.g., time data), some values dealing with finances (e.g., financial data), and some values dealing with product quantities (e.g., inventory data). At block 310 the outlier controller may determine to evaluate values dealing with inventory, or the outlier controller may receive user input specifying that the outlier controller is to evaluate values dealing with inventory, for example. In other embodiments, the class of values may be identified with a flag of a tuple, or the source of a tuple, or some other characteristic of the tuple.

In some embodiments, at block 310 a variety of outlier to evaluate may be determined. For example, at block 310 the outlier controller may determine to only utilize outliers which are much higher than expected or much lower than expected, as indicated by respective high and low threshold values. Other varieties of outliers may also be determined at block 310.

At block 320 tuple values are gathered. The tuple values are gathered from a stream of tuples from the stream application. The values may be gathered by an outlier controller. In embodiments where a class of tuple values was identified in block 310, the gathered tuples may be of the identified class. The amount of values which are gathered may be sufficient to determine the normal/standard operating range of values which come through the stream application. The normal operating range may include all values which are expected to pass through the stream application. For example, looking at FIG. 4, the normal operating range may include values which are within 3 standard deviations ($3\sigma$) of the expected value, which may round to approximately 99.7% of all possible values.

In some embodiments, the outlier controller may gather tuple values at a single location along the stream of tuples. For example, the outlier controller may gather tuple values from the source of the tuple stream, before a particular stream operator, or before a particular processing element. In other embodiments, the tuple values may be gathered at numerous locations along the stream of tuples. Where an outlier controller is gathering tuples at numerous locations, the outlier controller may continue gathering tuples until sufficient tuples to determine a normal operating range is determined. In some embodiments, the outlier controller may continue to a next operation of method 300 (e.g., block 330) for some locations of the stream of tuples for which sufficient data has been gathered while the outlier controller continues gathering data for other locations of the stream of tuples.

In some embodiments, a human operator may provide initial input (e.g., such input being received at block 310) on locations at which the outlier controller should gather values. In other embodiments, an outlier controller may detect a triggering event and, in response to said triggering event, determine locations at which to gather values. For example, an existing stream application may add a new source of tuples or some other new stream components. The outlier controller may detect this addition and may gather values at locations which are affected by this addition.

The tuple values may be gathered during a first period of time. The first period of time may be in the past (e.g., tuple values are stored in a database which is referenced by the outlier controller) or in the present (e.g., an outlier controller may gather all values at a first location in a stream of tuples for the next 24 hours). The tuples gathered during the first period of time may constitute a first window. A first window may include a first sequence of tuples that is a subset of the pseudo-infinite stream of tuples. The first window may include any amount of tuples. In some embodiments, the first window is not defined by the amount of time during which tuples are gathered, but instead by the number of tuples gathered. Put differently, the first window may include a predetermined amount of tuples; as soon as the outlier controller gathers the predetermined amount of tuples, the first window is flushed in the case of tumbling windows and slides in the case of sliding windows, such that no more tuples are gathered for the first window.

At block 330 the normal operating range of the gathered set of values is determined. The outlier controller may determine the normal operating range using the gathered set of tuple values. The outlier controller may perform a statistical analysis upon the set of tuple values to determine the normal operating range. The normal operating range may include values which satisfy a statistical threshold relating to how likely said values are to occur. Put differently, the normal operating range may include values which surpass a threshold likeliness of occurring. For example, the normal operating range may include values which have at least a 5% chance of occurring.

Figure 4:
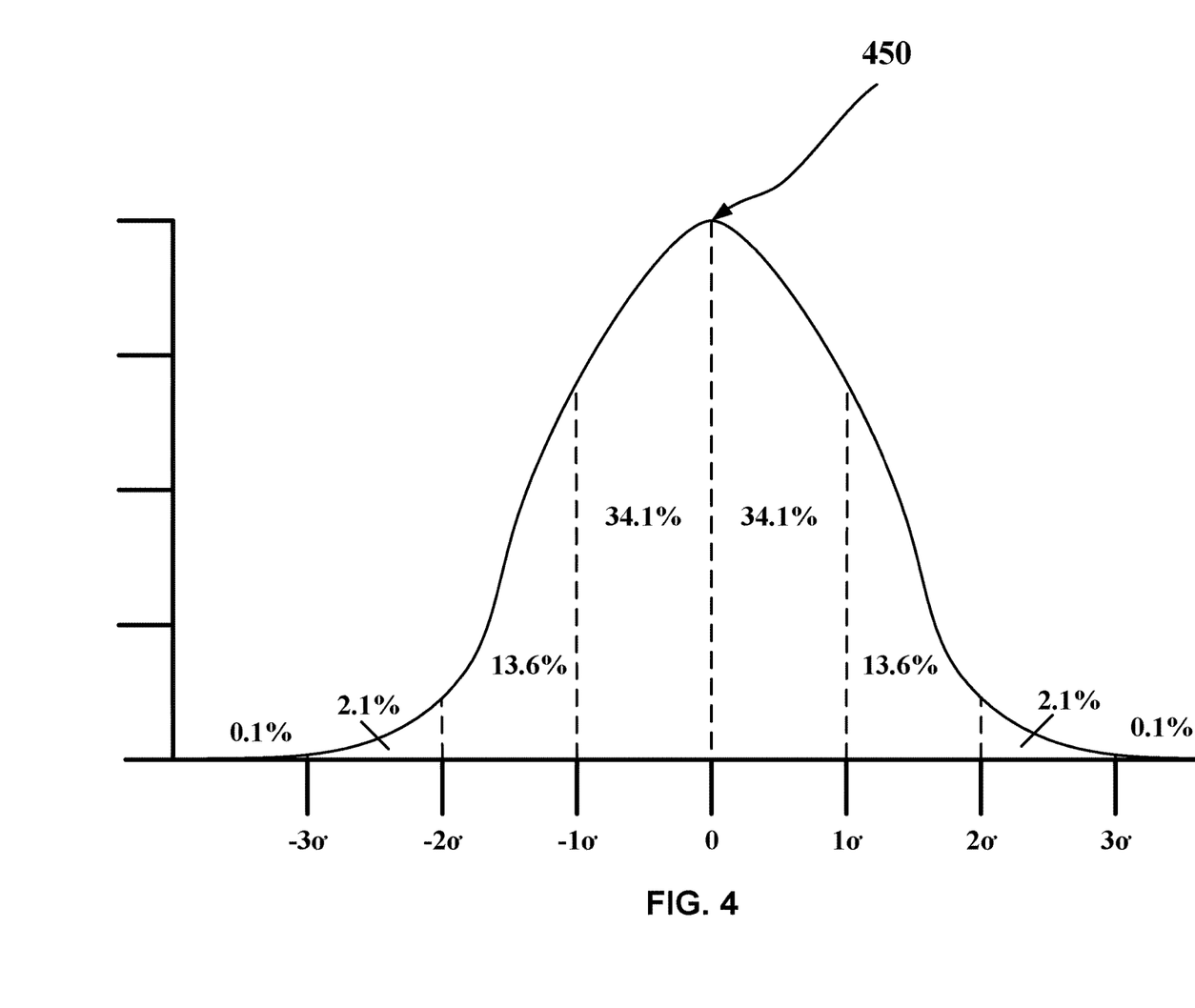
FIG. 4 depicts an example normal distribution of values of tuples with the stream of tuples, according to embodiments.

For example, referencing FIG. 4, in some embodiments the outlier controller may determine an average value of the stream of tuples 450. The outlier controller may then determine an upper value which mark three standard deviations above ($3\sigma$) the average value 450 and a lower value which marks three standard deviations below ($-3\sigma$) the average value 450. The outlier controller may then determine the normal operating range to include values between the lower limit and the upper limit, which may account for approximately 99.7% of all possible values.

In embodiments where tuple values are gathered at numerous locations at block 320, at block 330 the outlier controller may determine a normal operating range for each location at which tuple values were gathered. For example, if the outlier controller gathered tuple values before five different processing elements, the outlier controller may determine a distinct normal operating range for each of these five locations. Depending upon the operations performed upon the tuples between different gathering locations, the normal operating ranges may be within a similarity threshold. In embodiments where a plurality of locations have normal operation ranges that satisfy a similarity threshold, the outlier controller may use the same normal operating range for the plurality of locations, instead of storing/utilizing two substantially similar normal operating ranges.

In embodiments where a class of values was determined at block 310, the outlier controller may only determine a normal operating range for this class of values. Where numerous value classes were identified at block 310, normal operating ranges may be determined for each of these numerous value classes.

At block 340 one or more outliers are identified. Outliers are values which fall outside the normal operating range. The outlier controller may identify the outliers using statistical analysis. For example, an outlier may be a value which is at least three standard deviations away from the average value. The outlier controller may determine numerous outliers, such as one which is three standard deviations above, one is three standard deviations below, and one which is 3.5 standard deviations below. In some embodiments, the outlier controller may determine a series of outliers which ramp away from the average value (e.g., for an example normal operating range of $\pm 2$ standard deviations, a first outlier at 2 standard deviations away, a second outlier at 2.5 deviations away, a third outlier at 3 deviations away, and so forth). Other amounts of outliers are also possible. In other embodiments, the outlier controller may use other techniques known to one skilled in the art such as xmeans or the local outlier factor to determine the one or more outliers.

The outlier controller may determine one or more outliers for each distinct normal operating range. For example, if at block 320 values are gathered at 5 locations, while at block 330 only three substantially unique normal operating ranges are determined, the outlier controller may only identify outliers which relate to the three substantially unique normal operating ranges. Other embodiments of relating outliers to normal operating ranges are also possible.

In embodiments where a class of values was determined at block 310, the outlier controller may determine outliers only for those value classes which were specified. In some embodiments, at block 310 a type of outlier may also be specified. For example, a user may define an outlier as a value three standard deviations above the average value, or the user may define an outlier as a value three standard deviations below the standard deviation, or the user may specify that outliers may be either three standard deviations above or below the average value. In such embodiments as outlier type is specified, the outlier controller may determine outliers as specified.

At block 350 a manner of injecting the outliers into the stream of tuples may be determined. In embodiments where the set of tuple values was gathered during a first window, the outlier controller may determine to inject the outliers within the first window. The manner of injecting may relate to conditions of the stream application or of the system(s) which are running the stream application. For example, at block 350 the outlier controller may have calculated or otherwise have knowledge of an average rate of tuples within the tuple stream, and the outlier controller may determine to add the outlier values when the tuple rate of the tuple stream (e.g., the volume of tuples in the tuple stream at a given point in time) is relatively high as compared to the average rate of tuples (e.g., twice the average rate), or when the tuple rate is relatively low (e.g., half as many tuples as the average rate).

Alternatively, the outlier controller may determine to add the outliers in response to detecting a certain mixture of data in the stream of tuples. For example, a stream application may process five types of data, and the outlier controller may determine to add outliers in situations where one of the five types of data satisfies a threshold percentage of the data in the stream of tuples (e.g., where one type comprises 75% of the data in the tuple stream) during a time window.

Alternatively, the outlier controller may determine to add the outliers in response to detecting that the system(s) which run the stream application experiences particular load conditions. For example, the outlier controller may determine to inject outliers in response to detecting that a particular system (e.g., a particular system which assists in processing the stream application, such as a compute node 110 of FIG. 1) is currently using 85% or more of its processing capabilities, regardless of how much of the utilized 85% of processing capabilities are being devoted to the stream application. In some embodiments, at block 350 the outlier controller may determine a plurality of conditions upon which to inject the outliers. A human operator may determine the manner of injecting the outliers, or the outlier controller itself may independently determine the manner.

At block 360 a manner of removing the outlier(s) may be determined. In some embodiments, the outlier(s) may be removed after being processed by a single stream operator. In other embodiments, the outlier(s) may be removed after being processed by a plurality of stream operators or a plurality of processing elements. In certain embodiments, the outlier may be allowed to pass through the entirety of the operator graph before being removed. Alternatively, in some embodiments, outliers may never be removed, but instead be allowed to move through the entirety of the tuple stream.

In some embodiments, the functionality of block 350 or block 360 may be executed prior to block 320. In other embodiments, the functionality of block 350 or block 360 may be executed at the same time as block 310.

At block 370 the outliers are injected into the stream application. The outliers are injected into the stream of tuples. The outliers may be injected by the outlier controller in the manner determined by the outlier controller at block 350 and elsewhere throughout method 300. The outlier may be injected by an outlier source, similar to the outlier source 150 of FIG. 1. The outliers may be injected at the locations at which the tuple values were gathered at block 320. At block 380 the outlier values may be removed from the tuple stream as discussed herein. The outlier values may be removed as determined in embodiments within block 360.

In some embodiments, the outlier controller may inject the outliers into the stream application during initialization or as part of a testing procedure. In other embodiments, the outlier controller may inject the outliers during regular runtime. In certain embodiments, the outlier controller may regularly inject previous or newly created outliers as part of a systematic process or during regular maintenance.

In some embodiments, the outlier controller may determine a set of outliers for a given location which progressively move further away from the average value. For example, the outlier controller may determine one outlier at 2 standard deviations away, another outlier at 2.5 away, and a third outlier at 3 standard deviations away. In such embodiments, the outlier controller may inject the outliers such that each progressive outlier is further away from the average value. The outlier controller may record at block 390 how the system responds to each progressive outlier injection. By injecting progressively more extreme outliers, the outlier controller may determine threshold values at which the system reacts differently to the outlier (e.g., a value at which the outlier is far enough away from the expected value that the outlier causes a bug in the system).

In some embodiments, outliers may be injected once per location of the stream of tuples. In other embodiments, outliers may be injected a predetermined plurality of times, which may or may not be the same at every location of the stream of tuples. In yet other embodiments, the outlier controller may continue injecting outliers until the outlier controller has sufficient system reactions from block 390 (e.g., enough data to determine how the system will react to outliers in given situations).

For example, a stream application may process 5 types of values (e.g., time data, financial data for product 1, inventory data for product 1, financial data for product 2, and inventory data for product 2). Two new types of values (e.g., financial data for product 3, inventory data for product 3) may be added to the stream of tuples. The stream outlier may detect this addition in block 310, and may determine to evaluate the two new types with both upper and lower outliers. At block 320 the outlier controller may begin gathering tuples which relate to financial and inventory data for product 3. The outlier controller may gather such tuples at every point in the operator graph to which such tuples may reach, which may include ten locations. The outlier controller may gather sufficient tuple values in some locations of the operator graph faster than other locations, therein moving through method 300 faster.

Once the outlier controller gathers sufficient tuple values at block 330, the outlier controller may determine the normal operating range of said values, eventually identifying seven distinct normal operating ranges within the operator graph (e.g., where the last three locations share a single normal operating range). From this the outlier controller may identify an upper and lower outlier at block 340 for these seven distinct normal operating ranges. The outlier controller may then determine at block 350 to inject outliers at the first and second locations when a first compute node is using at least 85% of available processing power, to inject outliers at the third and fourth locations when a second compute node is using at least 90% of physical memory, to inject outliers at the fifth and sixth locations when the stream consists of at least 80% tuples regarding product 3, to inject outliers at the seventh and eighth locations when the stream is experiencing tuple volumes at least twice as high as normal, and to inject outliers at the ninth and tenth when all four conditions listed above are met independently and at once (e.g., resulting in outliers being injected in five different situations). At block 370 the outlier controller may then do so, continuing injecting outlier values at different locations until all conditions have been met and outliers have been injected. In some instances, the outlier controller may be able to inject outliers at some locations relatively sooner than other locations, as a result of the conditions upon which the outlier controller may inject outliers. In such instances, the outlier controller may continue to other operations of method 300 for those locations at which sufficient outliers have been injected, while holding steady at block 370 for those locations at which sufficient outliers have not yet been injected.

For another example, the outlier controller may determine to evaluate a set of 10,000 tuples of a specific type which will constitute a first window at block 320. The outlier controller may gather tuple values from a first window at block 320. At block 330, the outlier controller may determine the normal operating range of the values of the first window. At block 340, the outlier controller may determine 6 outliers for the first window, where three outliers get progressively greater than the average value of the 10,000 tuples and three outliers get progressively smaller than the average value of the 10,000 tuples. At block 350 the outlier controller may determine to inject the outliers immediately back into the first window in three waves (e.g., a first wave with the two nearest outliers, a second wave with the next two nearest outliers, and a third wave with the two furthest outliers). The outlier controller may alternatively determine to inject the outliers in to a second window of 10,000 tuples, or to inject each wave into a new window. At block 370 the outlier controller may thusly inject the outliers. The outlier controller may immediately calculate and inject the outliers, such that all six outliers are injected relatively early in the operator graph in a single window, where such injection is identified.

At block 390 the system reaction to the outlier values is detected. The outlier controller may record the system reaction with automated monitoring logs and automated system response. The system reaction may include unexpected software reactions to the outlier values. For example, the system reaction may include software bugs (e.g., from bugs in applications which were not written to account for the outliers) or software configuration errors (e.g., settings which should be readjusted to account for the possibility of naturally occurring-rather than injected-outliers). For example, a software application may be configured to graph dollar values of the stream of tuples. The graph may typically expect values from $10,000 to $75,000, and may scale the chart to incoming values. An outlier coming through with a value of $5,000,000 may render the graph visually unreadable for the "normal" values. As such, the outlier controller may detect that the graph should be configured to not visually graph values above a certain number, instead showing an off-screen peak.

For another example, a stream application may handle incoming prices on inventory, sending out "buy" prompts when commodities drop below certain rates. The outlier controller may determine that, where values of the stream of tuples include outlier values which are three standard deviations below the expected value (e.g., where the price is relatively extremely low), the stream application may fail to register the data. By identifying this processing failure, the stream controller may highlight this sub-optimal processing of outliers, after which the stream application may be reconfigured to make better use of this highly preferable data point. Other embodiments of systems reactions are also possible.

It is to be understood that the examples discussed above are provided for purposes of explanation only and are not to be construed as limiting. The functionality outlined in the discussions herein regarding FIG. 1, FIG. 2, and FIG. 3, above can be implemented using program instructions executed by a processing unit, as described in more detail below.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network 299 and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of injecting outlier values into a stream of tuples of a stream computing application, the method comprising:
   gathering a plurality of values of tuples of the stream of tuples;
   determining a normal operating range of values that includes values that are expected to occur within the stream of tuples, wherein all of the plurality of values are within the normal operating range;
   determining an outlier value, wherein the outlier value is outside of the normal operating range of values;
   generating a set of outliers such that each value in the set of outliers moves progressively from a first value near the normal operating range of values toward the outlier value;
   determining the rate of the stream of tuples meets a threshold, wherein the threshold includes a rate of tuples that is lower than the average rate of tuples;
   in response to determining the threshold has been met, injecting, via a tuple, the first value from the set of outliers into the stream of tuples;
   detecting a reaction to the first value; and
   injecting, in response to detecting a reaction to the first value, the next value from the set of outlier values.

2. The method of claim 1, wherein:
   the plurality of values is gathered from a first location of the stream of tuples; and
   the first value is injected at the first location.

3. The method of claim 1, further comprising:
   detecting a reaction to each value of the set of outlier values as they are injected; and
   removing, in response to detecting a reaction to each value of the set of outlier values as they are injected, the outlier value from the stream of tuples.

4. The method of claim 1, further comprising:
   detecting a reaction to each value of the set of outlier values as they are injected; and
   determining, in response to detecting a reaction to each value of the set of outlier values as they are injected, the outlier value will remain in the stream of tuples, such that the outlier value continues flowing through the stream of tuples until the outlier value reaches a sink of the stream of tuples.

5. The method of claim 1, further comprising:
   determining an injection criterion for outlier injection relating to the stream computing application;
   detecting the injection criterion in the stream computing application; and
   injecting the outlier value in response to detecting the injection criterion.

6. The method of claim 5, wherein the injection criterion relates to the load upon the stream computing application or the values within the stream computing application.

7. The method of claim 1, wherein the plurality of values is of a window of the stream of tuples.

8. The method of claim 7, wherein the outlier value is injected into the window within the stream of tuples.

9. The method of claim 1, wherein the stream of tuples relates to a plurality of data categories, further comprising:
   determining a data category of the plurality of data categories to evaluate, wherein the plurality of values of tuples are all of the data category, wherein the outlier value is of the data category.

10. A system, comprising:
    a processor; and
    a memory coupled to the processor, wherein the memory comprises instructions which, when executed by the processor, cause the processor to:
    gather a plurality of values of tuples of the stream of tuples;
    determine a normal operating range of values that includes values that are expected to occur within the stream of tuples, wherein all of the plurality of values are within the normal operating range;
    determine an outlier value, wherein the outlier value is outside of the normal operating range of values;
    generate a set of outliers such that each value in the set of outliers moves progressively from a first value near the normal operating range of values toward the outlier value;
    determine the rate of the stream of tuples meets a threshold, wherein the threshold includes a rate of tuples that is lower than the average rate of tuples;
    in response to determining the threshold has been met, inject, via a tuple, the first value from the set of outliers into the stream of tuples;
    detect a reaction to the first value; and
    inject, in response to detecting a reaction to the first value, the next value from the set of outlier values.

11. The system of claim 10, wherein:
the plurality of values is gathered from a first location of the stream of tuples; and
the first value is injected at the first location.

12. The system of claim 10, wherein the memory further comprises instructions which, when executed by the processor, cause the processor:
to detect a reaction to each value of the set of outlier values as they are injected; and
to remove, in response to detecting a reaction to each value of the set of outlier values as they are injected; the outlier value from the stream of tuples.

13. The system of claim 10, wherein the memory further comprises instructions which, when executed by the processor, cause the processor to:
determine an injection criterion for outlier injection relating to the stream computing application;
detect the injection criterion in the stream computing application; and
inject the outlier value in response to detecting the injection criterion.

14. The system of claim 10, wherein the reaction relates to a capacity of the processor.

15. The system of claim 10, wherein:
the plurality of values is of a window of the stream of tuples; and
the outlier value is injected into the window within the stream of tuples.

16. The system of claim 10, wherein the stream of tuples relates to a plurality of data categories, wherein the memory further comprises instructions which, when executed by the processor, cause the processor to:
determine a data category of the plurality of data categories to evaluate, wherein the plurality of values of tuples are all of the data category, wherein the outlier value is of the data category.

17. A computer program product for injecting outlier values into a stream of tuples of a stream computing application, the computer program product disposed upon a computer readable storage medium, the computer program product comprising computer program instructions that, when executed by a computer processor of a computer, cause the computer to:
gather a plurality of values of tuples of a stream of tuples of a stream computing application;
determine a normal operating range of values that includes values that are expected to occur within the stream of tuples, wherein all of the plurality of values are within the normal operating range;
determine an outlier value, wherein the outlier value is outside of the normal operating range of values;
generate a set of outliers such that each value in the set of outlier values moves progressively from a first value near the normal operating range of values toward the outlier value;
determine a mixture of data in the stream of tuples meets a set of criteria, wherein the set of criteria includes a rate of tuples that is lower than the average rate of tuples;
in response to determining the set of criteria has been met, inject, via a tuple, the first value from the set of outlier values into the stream of tuples;
detect a reaction to the first value; and
inject, in response to detecting a reaction to the first value, progressively each value from the set of outlier values.

18. The computer program product of claim 17, the computer program product further comprising computer program instructions that, when executed by the computer processor, cause the computer to:
determine an injection criterion for outlier injection relating to the stream computing application;
detect the injection criterion in the stream computing application; and
inject the outlier value in response to detecting the injection criterion.

19. The computer program product of claim 17, wherein the set of criteria includes a data classification mix of the data in the stream of tuples.

* * * * *